(12) United States Patent
Tsubata et al.

(10) Patent No.: US 6,238,312 B1
(45) Date of Patent: May 29, 2001

(54) VEHICULAR TRANSMISSION

(75) Inventors: Yoshimichi Tsubata; Tomoyuki Kanda; Eiji Ohyama; Eiji Suzuki; Naoki Uchiyama, all of Wako (JP)

(73) Assignee: Honda Giken Kogyo Kabushiki Kaisha, Toyko (JP)

( * ) Notice: Subject to any disclaimer, the term of this patent is extended or adjusted under 35 U.S.C. 154(b) by 0 days.

(21) Appl. No.: 09/391,239

(22) Filed: Sep. 7, 1999

(30) Foreign Application Priority Data

Sep. 8, 1998 (JP) .................................................. 10-253358

(51) Int. Cl.$^7$ .............................. F16H 57/04; F16H 57/02
(52) U.S. Cl. ............................. 474/144; 474/43; 474/91; 474/146; 74/606 A
(58) Field of Search ............................ 474/28, 18, 68, 474/70, 43–46, 144–146, 91–93, 149, 150, 8–14; 74/606 R, 606 A

(56) References Cited

U.S. PATENT DOCUMENTS

| | | | |
|---|---|---|---|
| 4,497,285 | * | 2/1985 | Kondo ............................ 74/606 A X |
| 5,033,989 | * | 7/1991 | Shimaguchi ....................... 474/43 X |
| 5,152,361 | * | 10/1992 | Hasegawa et al. ................. 474/13 X |
| 5,605,513 | * | 2/1997 | Ven Der Hardt Aberson ... 474/91 X |
| 5,607,371 | * | 3/1997 | Yamaguchi ....................... 474/43 X |
| 5,800,299 | * | 2/1985 | Lamers et al. ..................... 474/91 X |
| 5,976,044 | * | 2/1985 | Kuyama ......................... 74/606 A X |

FOREIGN PATENT DOCUMENTS 4-258528    9/1992   (JP) .
8-285023   11/1996   (JP) .

* cited by examiner

*Primary Examiner*—David A. Bucci
*Assistant Examiner*—Marcus Charles
(74) *Attorney, Agent, or Firm*—Armstrong, Westerman, Hattori, McLeland & Naughton, LLP

(57) ABSTRACT

In a chamber R1 which accommodates a transmission device comprising a drive pulley 8, a driven pulley 9 and a belt 10, a cover 51 is provided to cover the lower peripheral portion of the drive pulley 8 along the periphery. The drive pulley is positioned below the driven pulley, and raised portions 52 which are used for the detection of the rotational speed of the drive pulley are provided on the periphery of the drive pulley. The end surface 51$bs$ of the cover facing the inner wall 54 of the pulley chamber is positioned away from the inner wall with a clearance V therebetween. In a vehicular transmission which is constructed in this arrangement, the amount of lubrication oil that flows near to the periphery of the pulley which is positioned lower is comparatively small. Thus, this arrangement restricts agitation of the lubrication oil, which may be caused by the raised portions of the rotating pulley. Therefore, loss in the rotation of the pulley and oxidation and degradation of the lubrication oil are effectively prevented.

3 Claims, 6 Drawing Sheets

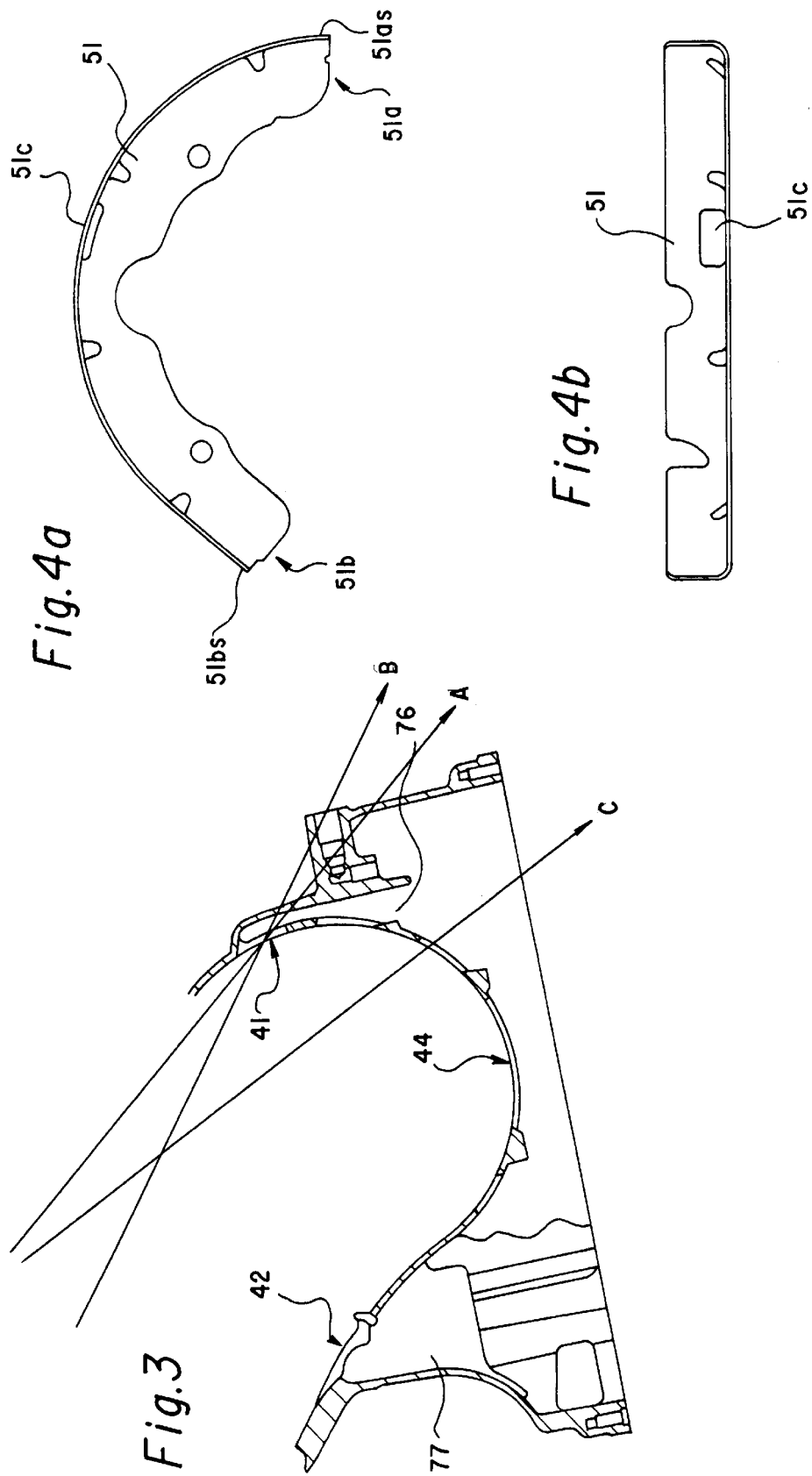

VEHICULAR TRANSMISSION

BACKGROUND OF THE INVENTION

1. Field of the Invention

The present invention relates generally to a transmission which is used on a vehicle, and more particularly to the configuration of a housing (i.e., a transmission case) used for a belt-type continuously variable transmission which comprises a pair of pulleys and a belt disposed around these pulleys.

2. Description of the Related Art

Power transmissions which transmit power by a belt disposed around a pair of pulleys have been well-known and are widely used. As such a transmission, a belt-type continuously variable transmission comprises a pair of pulleys, each pulley having a variable groove width, and a belt disposed therearound. The V-belt pitch radii of the pulleys are variably changed by adjusting the groove widths of the pulleys, so that the speed ratio of the transmission is continuously varied. It has been known that this type of transmission can be used on a vehicle as disclosed in Japanese Laid-Open Patent Publication No. H4(1992)-258528(A), which was filed by the present invention.

This vehicular continuously variable transmission comprises drive and driven pulleys, a belt, a forward-reverse selector mechanism, a starting mechanism, a reduction train, a differential mechanism, etc. in a hosing, and for lubricating these mechanisms, forced-feed lubrication or sprinkled lubrication by gear rotation is carried out. The oil used for this lubrication is also used as a hydraulic pressure controlling fluid (hydraulic oil) for controlling the adjustment of the groove widths of the drive and driven pulleys and for controlling a clutch.

The hydraulic pressure which is used for the forced-feed lubrication and for the hydraulic control is generated by a hydraulic pump which is driven by an engine through a gear or a chain mounted on a shaft that is coupled to the engine, and the hydraulic pressure is delivered to the components which require lubrication and to the components which require hydraulic pressure control. After the hydraulic pressure is used for the respective purposes, the hydraulic oil flows downward from the respective components. Therefore, the transmission includes an oil well or an oil pan to collect the hydraulic oil, which is then recirculated by the hydraulic pump.

The oil which has been used for the lubrication and for the actuation returns to the oil pan which is provided in the lower portion of the housing. However, in the room that accommodates the transmission mechanism which includes the above mentioned drive and driven pulleys (this room is hereinafter referred to as "the pulley chamber"), some oil is thrown from the pulleys radially outward because of the rotation of the pulleys (centrifugal force). In a similar manner, some oil is thrown from the belt approximately in the directions of the straight portions of the belt, near and at each inflection point where the direction of the motion of the belt drastically changes from a straight line, which is formed by the belt extending between the pulleys, to an arc, which is formed by the belt disposed around a respective pulley, because of the motion of the belt. The oil sprayed in this manner hits the inner walls of the pulley chamber and flows down along the inner walls into the oil pan.

More specifically, the oil flowing down along the inner walls of the pulley chamber is led into a inlet of an oil passage which is connected to the oil pan. When an large amount of lubrication oil is being used, for example, while the engine rotates at a high rotational speed, the amount of the oil flowing down along the inner wall of the chamber also increases, and the oil accumulates at the lower portion of the pulley chamber. In this situation, the friction from the lubrication oil which acts as a drag (rotational resistance) especially against the rotation of one of the drive and driven pulleys positioned lower in the chamber increases as the amount of the oil flowing down and accumulating in the chamber increases.

In such a belt-type continuously variable transmission, typically, to detect the rotational speed of the respective pulley, each of the drive and driven pulleys includes about 20 to 30 raised portions, and proximity sensors which sense these protrusions are provided in the housing. In a condition where the amount of oil used for lubrication increases as described above and where the oil accumulates at the bottom of the pulley chamber, the lubrication oil may be agitated by these raised portions, resulting in a problem of foaming of the lubrication oil. Also, the agitation of the oil at a high temperature, if it happens, promotes the oxidation and degradation of the lubrication oil.

To solve this problem, for example, Japanese Laid-Open Patent Publication No. H8(1996)-285023(A) discloses a method that provides a relatively large opening which leads directly to the oil pan, at the lower portion of the pulley chamber or an inlet for a discharge oil passage to return the oil which flows down along the inner walls to the oil pan, near the middle point of a line drawn between the two pulleys tangentially to the peripheries of the pulleys.

However, for example, the provision of a relatively large opening leading to the oil pan at the lower portion of the pulley chamber requires a compromise of the strength of the entire transmission housing including the pulley chamber, so there is a limit to the size of the opening. In addition, because the level of the oil in the oil pan varies in correspondence to the driving condition of the vehicle, one of the pulleys positioned lower than the other may happen to be immersed into the oil. In this case, the above mentioned friction increases further.

On the other hand, for the provision of an inlet opening for a discharge oil passage, near the middle point of a line tangent to the peripheries of the pulleys, a little effect has been confirmed in returning to the oil pan the oil which flows down along the inner wall on which the inlet opening is provided. However, some oil flows down along other walls, and some other oil drips directly from one of the pulleys positioned above the other. As a result, a certain amount of lubrication oil accumulates at the bottom of the pulley chamber, so a problem of agitation of the lubrication oil may occur as mentioned above.

SUMMARY OF THE INVENTION

It is an object of the present invention to restrict the increase of the rotational friction caused by the lubrication oil which accumulates in the pulley chamber (i.e., the accommodation chamber for the transmission device) when the amount of the lubrication oil increases.

It is another object of the present invention to prevent shortening of the life of the lubrication oil, which may be caused from agitation by one of the pulleys in the pulley chamber when the amount of the lubrication oil increases.

It is yet another object of the present invention to provide a design that effectively restricts any increase of the rotational friction for the pulleys and shortening of the life of the lubrication oil, both of which may be caused from agitation of the lubrication oil by the pulleys when the level of the lubrication oil in the oil pan changes while the vehicle is driven.

A vehicular transmission according to the present invention comprises a transmission device, which includes a drive pulley, a driven pulley and a belt which is disposed around these two pulleys for torque transmission, and a pulley chamber (also referred to as "chamber accommodating the transmission device" in claims or as "first room R1" in the following embodiment) which accommodates the transmission device. On the periphery of the drive or driven pulley, a raised portion is provided for the detection of the rotational speeds of the pulleys, and a cover is provided along the periphery of the drive or driven pulley that is positioned at the lower side of the chamber to cover the lower peripheral portion of the lower pulley, which includes the raised portion.

In this construction, the lubrication oil which flows down along the inner walls of the pulley chamber and accumulates at the bottom of the pulley chamber is isolated by the cover, which covers the lower periphery of the pulley which rotates at the lower position in the pulley chamber. Therefore, the amount of lubrication oil staying in the space partitioned by the cover for the lower pulley is relatively small, so this arrangement restricts agitation of the lubrication oil which may be caused by the rotation of the lower pulley. As a result, there isn't much rotational loss, and also, the lubrication oil can be usable for a relatively long period of time. Furthermore, because the cover covers the lower peripheral portion of the pulley, which includes the raised portion used for the detection of the rotational speed of the pulley, the raised portion, which rotates and may cause the above mentioned problem of agitation, is isolated in the cover. Furthermore, as the rotational direction of the pulleys stays in one direction except when the vehicle moves backward, the direction of the flow of the lubrication oil in the cover also stays in the same direction. This condition keeps the rotational loss relatively small for the pulleys and makes the lubrication oil usable for a comparatively long period of time.

It is preferable to provide a clearance between the inner wall of the chamber and the end surface of the cover which faces the inner wall. This arrangement prevents the lubrication oil flowing down along the inner wall of the chamber from flowing directly into the cover.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein:

FIG. 3 is a partial sectional view of the housing;

FIGS. 4a and 4b are a front view and a side view, respectively, of a cover, which is installed in the pulley chamber;

DESCRIPTION OF THE PREFERRED EMBODIMENTS

Figure 6:
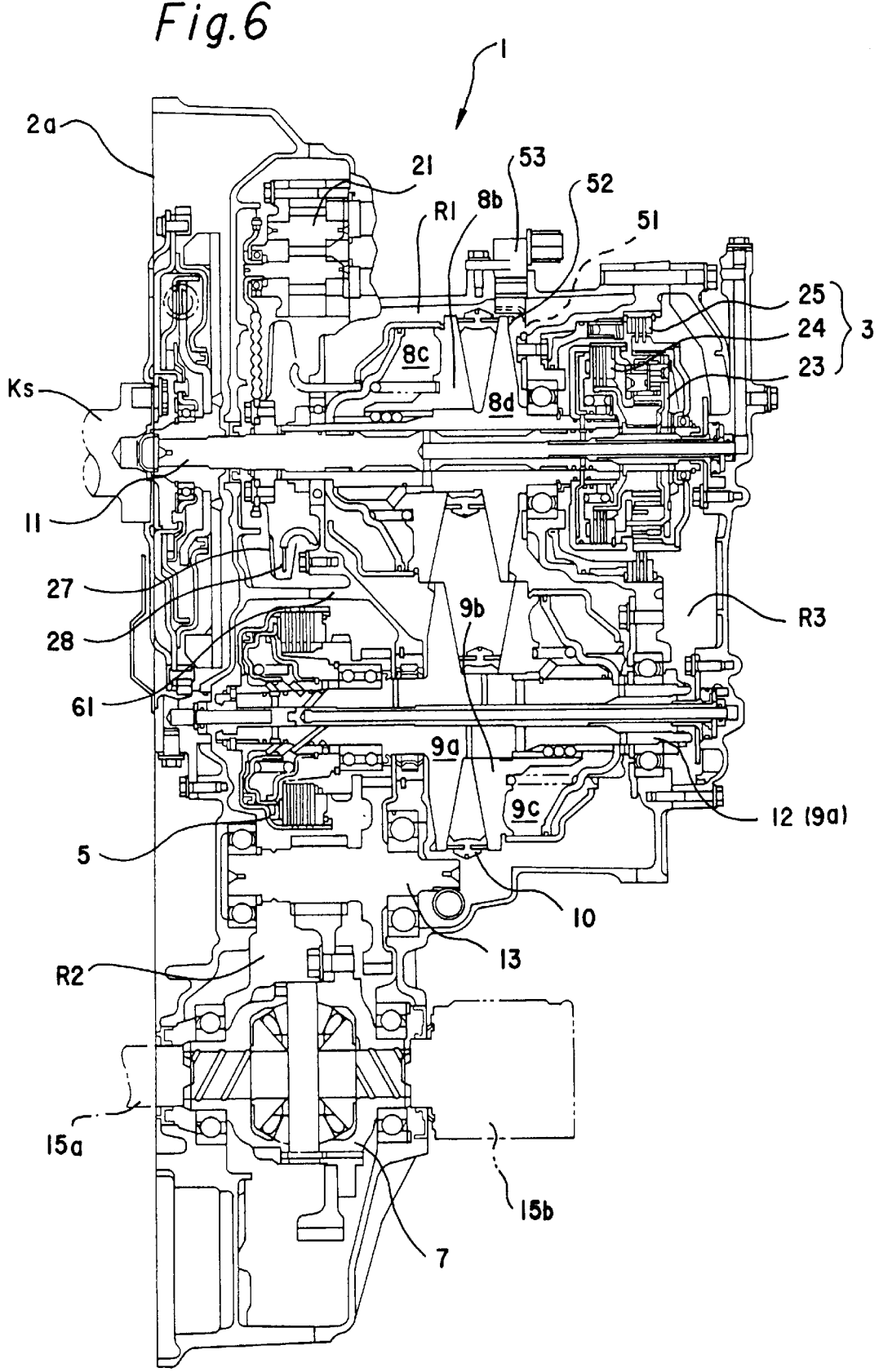
FIG. 6 is an illustrative drawing showing the construction of the vehicular transmission.
Figure 7:
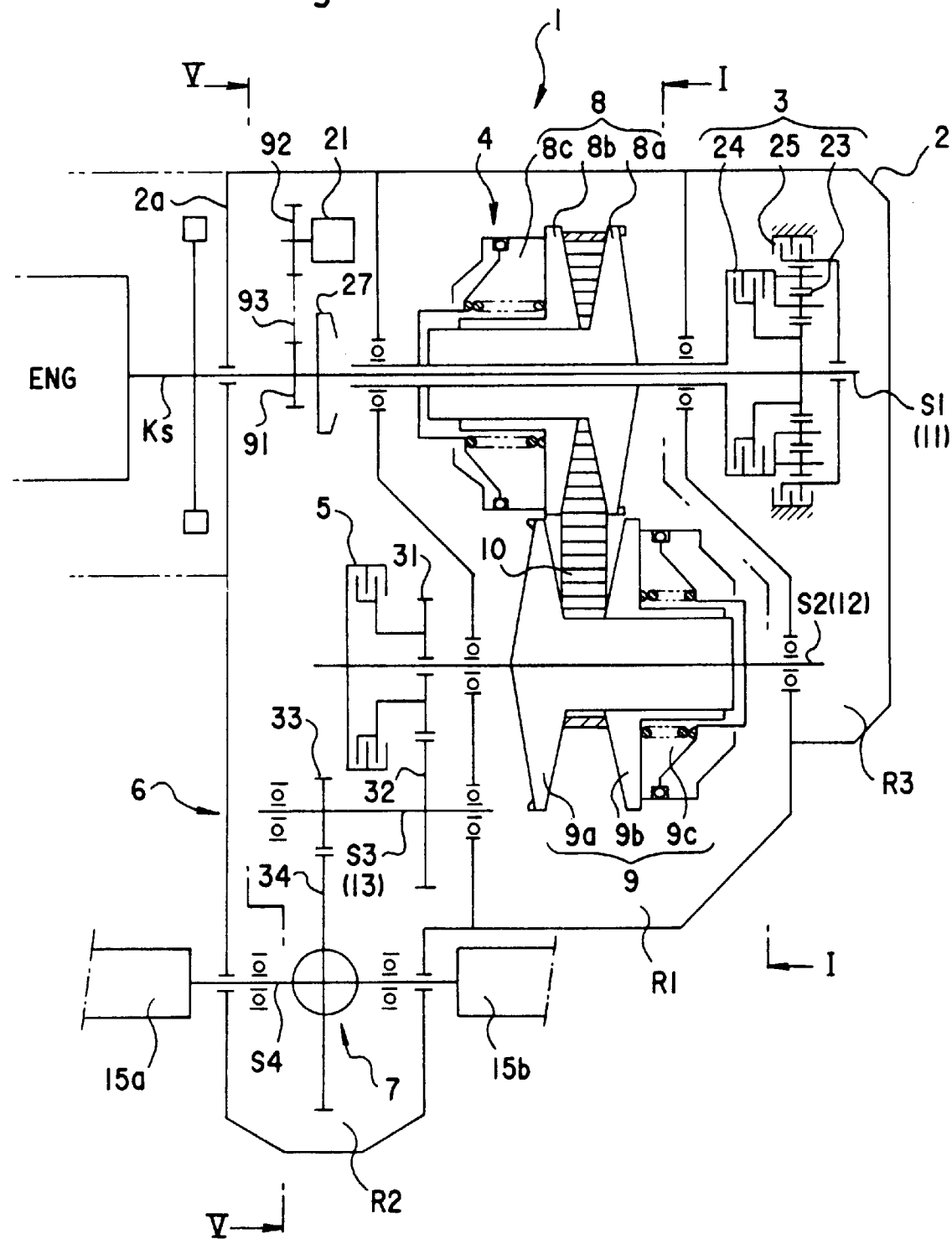
FIG. 7 is a schematic diagram showing the construction of the vehicular transmission.

FIGS. 6 and 7 show the construction of a belt-type continuously variable transmission 1. This belt-type continuously variable transmission 1 comprises a forward-reverse selector mechanism 3, a belt-type continuous speed change mechanism 4, a starting mechanism 5 (i.e., a starting clutch), a reduction train 6 (a train of gears 31 through 34), a differential mechanism 7, a power supply mechanism (including sprockets 91 and 92 and a chain 93) for transmitting power to an oil pump provided in a transmission housing 2, which is attached to an engine at an abutment surface 2a. The crank shaft Ks of the engine is coupled to a drive plate of a flywheel which drives the input shaft 11 (also referred to as "first shaft") of the transmission according to the present invention.

The driving force from the engine is transmitted from the first shaft S1 (including the input shaft 11 of the transmission) through a second shaft S2 (including the output shaft 12 of the transmission) and through each of the above mentioned mechanisms to a fourth shaft S4, which drives the axles 15a and 15b of a vehicle. The housing of the transmission comprises a first room R1, which accommodates the belt-type continuous speed change mechanism 4, a second room R2, which accommodates the starting mechanism 5, the reduction train 6, the differential mechanism 7, etc., and a third room R3, which accommodates the forward-reverse selector mechanism 3.

In this belt-type continuously variable transmission, a drive pulley 8 is provided for the belt-type continuous speed change mechanism 4 on the first shaft S1 in the first room R1, and the forward-reverse selector mechanism 3 is arranged in the third room R3. The crank shaft Ks of the engine is coupled to the input shaft 11 in the first shaft S1, and the input shaft 11 is connected to the forward-reverse selector mechanism 3 through the drive pulley 8, whose central part is hollow.

The forward-reverse selector mechanism 3 comprises a double pinion type planetary gear 23 and includes a forward drive clutch 24, which directly connects the input shaft 11 to the drive pulley 8, and a rearward drive brake 25, which is capable of holding the ring gear stationary. When these forward drive clutch 24 and rearward drive brake 25 are selectively activated, the drive pulley 8 is rotated clockwise or counter-clockwise with respect to the input shaft 11.

The drive pulley 8 comprises a stationary pulley half 8a and a movable pulley half 8b, which is movable with respect to the stationary pulley half 8a over the spindle of and in the axial direction of the stationary pulley half 8a. The drive pulley 8 further comprises a cylinder chamber 8c, which is provided on the outside of the movable pulley half 8b to move the movable pulley half 8b in the axial direction by the hydraulic pressure supplied thereinto.

The hydraulic pressure which drives the movable pulley half 8b is supplied through an oil passage which is formed in the input shaft 11 and through an oil passage provided in the stationary pulley half 8a into the cylinder chamber 8c. By controlling this hydraulic pressure (referred to as "pulley thrust pressure"), the position of the movable pulley half 8b, i.e., the width of the V groove of the drive pulley 8, is adjusted. From this oil passage which passes through the input shaft 11, additional oil passages are provided between the input shaft 11 and the stationary pulley half 8a, both of which rotate together, and also between the stationary pulley half 8a and the movable pulley half 8b, and to the planetary gear 23 and to the forward drive clutch 24, and the lubrication oil is supplied to carry out the lubrication of these components at the same time.

In the first room R1, the driven pulley 9 of the belt-type continuous speed change mechanism 4 is provided on the second shaft S2 (including the output shaft 12), which extends in parallel with and at a predetermined distance from the first shaft S1. The starting clutch 5 and the first gear 31 of the reduction train 6 are rotatably provided in the second room R2. The output shaft 12 in the second shaft S2 is formed in a one body with the stationary pulley half 9a of the driven pulley 9, and the driven pulley 9 further comprises a movable pulley half 9b, which is movable with respect to the stationary pulley half 9a over the spindle of and in the axial direction of the stationary pulley half 9a, and a cylinder chamber 9c is provided on the outside of the movable pulley half 9b to move the movable pulley half 9b in the axial direction by the hydraulic pressure supplied thereinto.

The hydraulic pressure which drives the movable pulley half 9b is supplied through an oil passage which is formed in the output shaft 12 into the cylinder chamber 9c. The hydraulic pressure supplied into the cylinder chamber 9c is predetermined in consideration of the basic characteristics of the transmission, such as the transmission torque. In the output shaft 12, oil passages for supplying the lubrication oil are provided between the stationary pulley half 9a and the movable pulley half 9b, and to the starting clutch 5, to the secondary drive gear 31, and to the bearing portions which supports the output shaft 12 rotatably, and all these rotatable components of the transmission are lubricated together.

The belt-type continuous speed change mechanism 4 further comprises a belt 10, which is disposed around the drive pulley 8 and the driven pulley 9, and the rotation of the drive pulley 8 is transmitted to the driven pulley 9 through the belt 10. The control of the speed ratio is executed by changing the thrust pressure of the drive pulley 8 with respect to the pressure of the cylinder chamber 9c of the driven pulley 9, which pressure is kept at constant (this constant pressure is referred to as "line pressure").

Namely, when the hydraulic pressure supplied into the cylinder chamber 8c of the drive pulley 8 is increased, the groove width of the drive pulley 8 will become narrower, and the pitch radius of the drive pulley 8, around which the belt 10 is disposed, will become greater. Because the length of the belt 10 is constant, the tension generated in the belt 10 will act to widen the groove width of the driven pulley 9, thereby making the pitch radius of the driven pulley 9 smaller. On the other hand, if the thrust pressure of the drive pulley 8 is decreased with respect to that of the driven pulley 9, then the opposite action is achieved. In this way, the relative thrust pressure difference between the hydraulic pressures which are supplied to the movable pulley halves of the drive and driven pulleys 8 and 9, respectively, is utilized to adjust the movable pulley halves 8b and 9b to achieve an appropriate relation in the groove widths and pitch radii of the drive and driven pulleys 8 and 9. Thus, the rotational speed ratio can be changed continuously between the drive and driven pulleys 8 and 9.

The oil pump 21, which is provided in the second room R2, is driven by the input shaft 11 through the sprocket 91, which is disposed on the input shaft 11, the sprocket 92, which is provided to the oil pump 21, and the chain 93, which is disposed around both the sprockets. The oil pump 21, through a suction oil passage, sucks the lubrication oil in an oil pan, which is provided at the lower portion of the transmission, through a strainer or filter, which is incorporated in the oil pump 21, for purification. The oil sucked and delivered by the oil pump 21 is used for the hydraulic pressure control, the lubrication, and the cooling of the transmission.

The first gear 31 is mounted over the output shaft 12 through the starting clutch 5 on the left side of the driven pulley 9. The starting clutch 5 is operated to control the transmission of the driving force. The second gear 32 and the third gear 33 are formed in a one body on a third shaft 13, which is positioned in the shaft S3. This shaft S3 is disposed in parallel with and at a predetermined distance from the second shaft S2, and the second gear 32 meshes with the first gear 31. In addition, the differential mechanism 7 is arranged on the fourth shaft S4, which is disposed in parallel with and at a predetermined distance away from the third shaft S3, and the fourth gear 34, which is coupled to the differential mechanism 7, meshes with the third gear 33.

These first through fourth gears (31, 32, 33 and 34) constitute the gear train which transmits the power, and the rotation of the driven pulley 9 is transmitted through this gear train to the differential mechanism 7. As the left and right axles 15a and 15b are connected to the differential mechanism 7, the power transmitted to the differential mechanism 7 is divided to the axles 15a and 15b, which rotate the right and left wheels (not shown).

Figure 1:
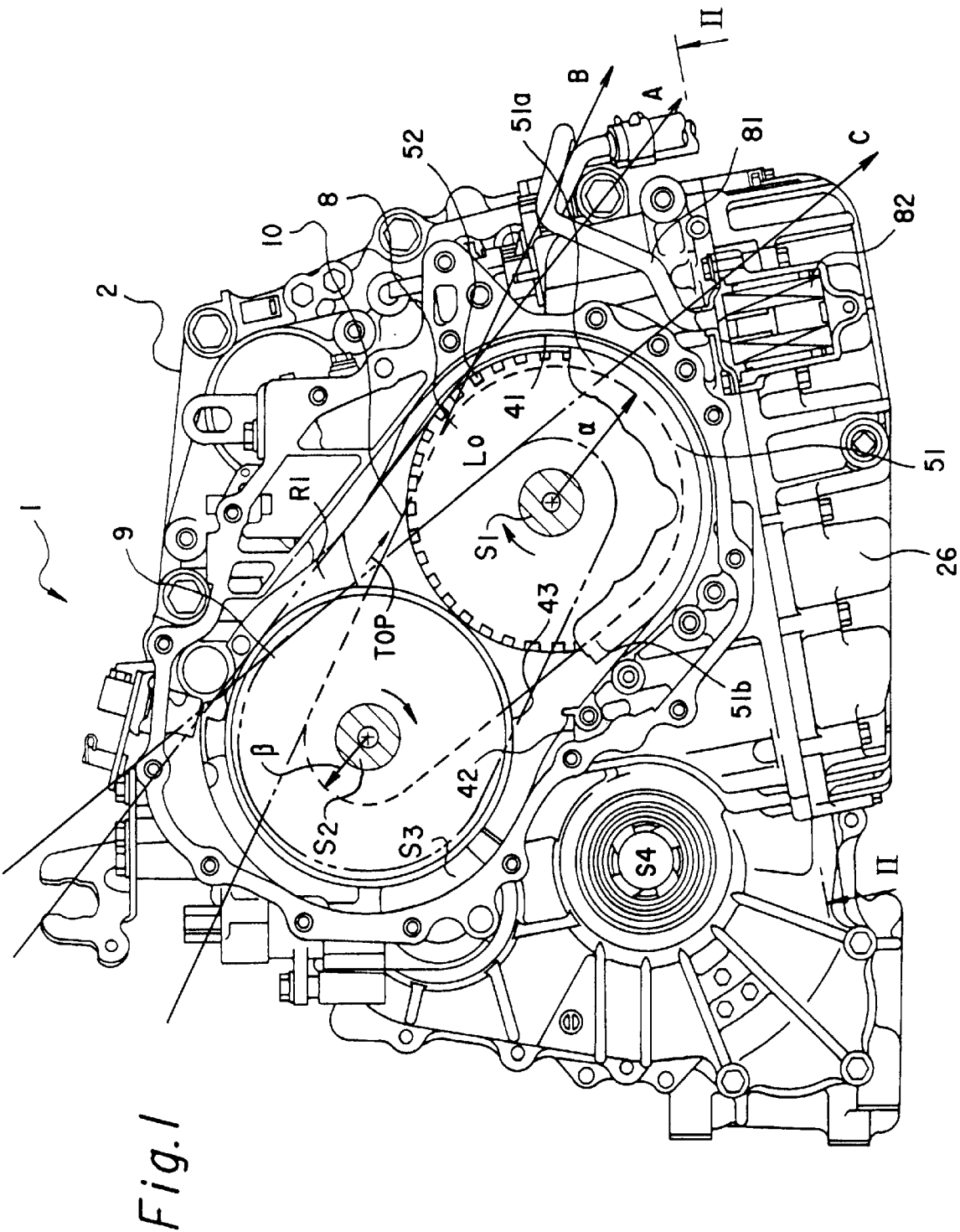
FIG. 1 is a sectional view showing the inside of a chamber (pulley chamber) which accommodates the transmission device of a vehicular transmission according to the present invention.

As shown in FIG. 1, the lower portion of the housing of this belt-type continuously variable transmission constructed for vehicular use as described above, includes the oil pan 26, which collects the lubrication oil used for the lubrication and cooling of the transmission, and the oil pump 21, which recycles the oil collected in the oil pan 26 through a filter or a suction strainer. Moreover, part of the oil discharged from the oil pump 21 is cooled by an oil cooler and is returned laterally to the oil pan 26 through a return line 81 and a filter 82.

FIG. 1 is a front view (a view seen in the direction indicated by arrows I—I in FIG. 7) of the continuous speed change mechanism of the vehicular transmission according to the present invention, and it shows the inside of the first room R1 (pulley chamber), which accommodates the drive pulley 8, the driven pulley 9, and the belt 10, which are shown also in FIG. 7. S1 through S4 in FIG. 1 correspond with S1 through S4 in FIG. 7. The power transmitted from the drive pulley 8 (i.e., the first shaft S1), which is shown in the lower right of FIG. 1, to the driven pulley 9 (i.e., the second shaft S2), which is shown in the upper center, is then transmitted through the second shaft S2, which extends through the wall of the pulley chamber R1, to the starting mechanism, which is located in the second room R2. Then, in the second room R2, the power is transmitted to the reduction train 6 (third shaft S3) and to the differential mechanism 7 (fourth shaft S4).

Under the lower portion of these rooms, i.e., the first and second rooms R1 and R2, the above described oil pan 26 is provided. In the figures referred in the following description, the identical numerals are used for the identical parts, and no further description is given of the parts which have been already explained in reference to FIGS. 6 and 7. The following description is based on the transmission being mounted on a vehicle unless otherwise specified, and the rotational direction of the drive pulley 8, the driven pulley 9 and the belt 10 is in the direction indicated by an arrow in the FIG. 1. In this embodiment, the front and rear direction of the vehicle is perpendicular to the input and output shaft of the continuously variable transmission (i.e., the engine is placed laterally). However, the present invention is not limited to this arrangement and is applicable to the arrangement where the engine is disposed longitudinally along the vehicle. To simplify the description, expressions "the front of the vehicle" or "the rear of the vehicle" is used to describe the direction. For example, the right side of the drawing of FIG. 1 in this embodiment is the front of the vehicle (i.e., the forward direction of the vehicle).

As described above in reference with FIG. 6, the lubrication oil to the drive pulley 8, which is mounted on the input shaft 11 (first shaft S1), and to the driven pulley 9, which is mounted on the output shaft 12 (second shaft S2), is supplied through the oil passages which pass through the center of the shafts, respectively, and it is sprayed radially outward in the direction which is perpendicular to the respective shafts by the centrifugal forces generated from the rotation of the respective pulleys and hits the inner wall of the pulley chamber R1. As for the driven pulley 9, which is shown at the upper left in the drawing, the lubrication oil is also sprayed in a large amount from the bottom of the V groove to the inner face of the belt 10.

Part of this lubrication oil is thrown radially over the V surface of the rotating driven pulley 9 by the centrifugal force and hits the inner wall of the pulley chamber R1 which is positioned perpendicular to the second shaft S2. The portion of the lubrication oil which sticks to the belt 10 is carried by the belt, and most of it departs from the belt by its own inertia near and at each inflection point where the direction of the motion of the belt drastically changes from a straight line, which is formed by the belt extending between the pulleys, to an arc, which is formed by the belt disposed around a respective pulley. This portion of the lubrication oil is also thrown to the inner wall of the pulley chamber R1.

The direction of the straight portions of the belt, which extend between the pulleys, changes as the speed change ratio of the transmission, i.e., the ratio between the pitch radii of the drive and driven pulleys is being varied. In FIG. 1, line B is the line drawn on the upper side of the pulleys which line is tangent to the pitch circle of the drive pulley whose pitch radius is at a maximum, which is indicated by α, and to that of the driven pulley whose pitch radius is at a minimum, which is indicated by β (i.e., the transmission is at the TOP speed change ratio). Line C is the line drawn also on the upper side of the pulleys which line is tangent to the pitch circle of the drive pulley whose pitch radius is at a minimum and to that of the driven pulley whose pitch radius is at a maximum (i.e., the transmission is at the LOW speed change ratio). Line A is the line drawn on the upper side of the pulleys which line is tangent to the peripheries of the two pulleys.

In the direction of the line B, which is drawn on the upper side of the pulleys tangentially to the pitch circle of the drive pulley whose pitch radius is at a maximum and to that of the driven pulley whose pitch radius is at a minimum, an inlet opening 41 is provided for an oil discharge passage 76 at the portion of the inner wall of the pulley chamber near the drive pulley 8 where the line B meets the inner wall, to lead the oil which is thrown from the belt, directly to the outside of the pulley chamber. Furthermore, this inlet opening 41 is located also at the portion of the inner wall where the line A, which is drawn on the upper side of the two pulleys tangentially to the peripheries of the pulleys, meets the inner wall.

In this embodiment, one inlet opening is provided at the portion of the inner wall which is located at the point of intersection of the line B and the line A. In this case, the line B is drawn on the upper side of the pulleys tangentially to the pitch circle of the drive pulley whose pitch radius is at a maximum and to that of the driven pulley whose pitch radius is at a minimum while the line A is drawn on the upper side of the two pulleys tangentially to the peripheries of the pulleys as mentioned above. However, if these lines meet the inner wall at two different points, then two inlet openings may be provided each at a respective point. In addition to this inlet opening 41, another inlet opening 42 for a discharge oil passage 77 is provided at the portion of the inner wall which faces upward in the pulley chamber, equidistantly to both the pulleys, and the oil flowing down along the inner walls is led to this inlet opening and then through the discharge oil passage 77 to the outside of the pulley chamber.

Figure 2:
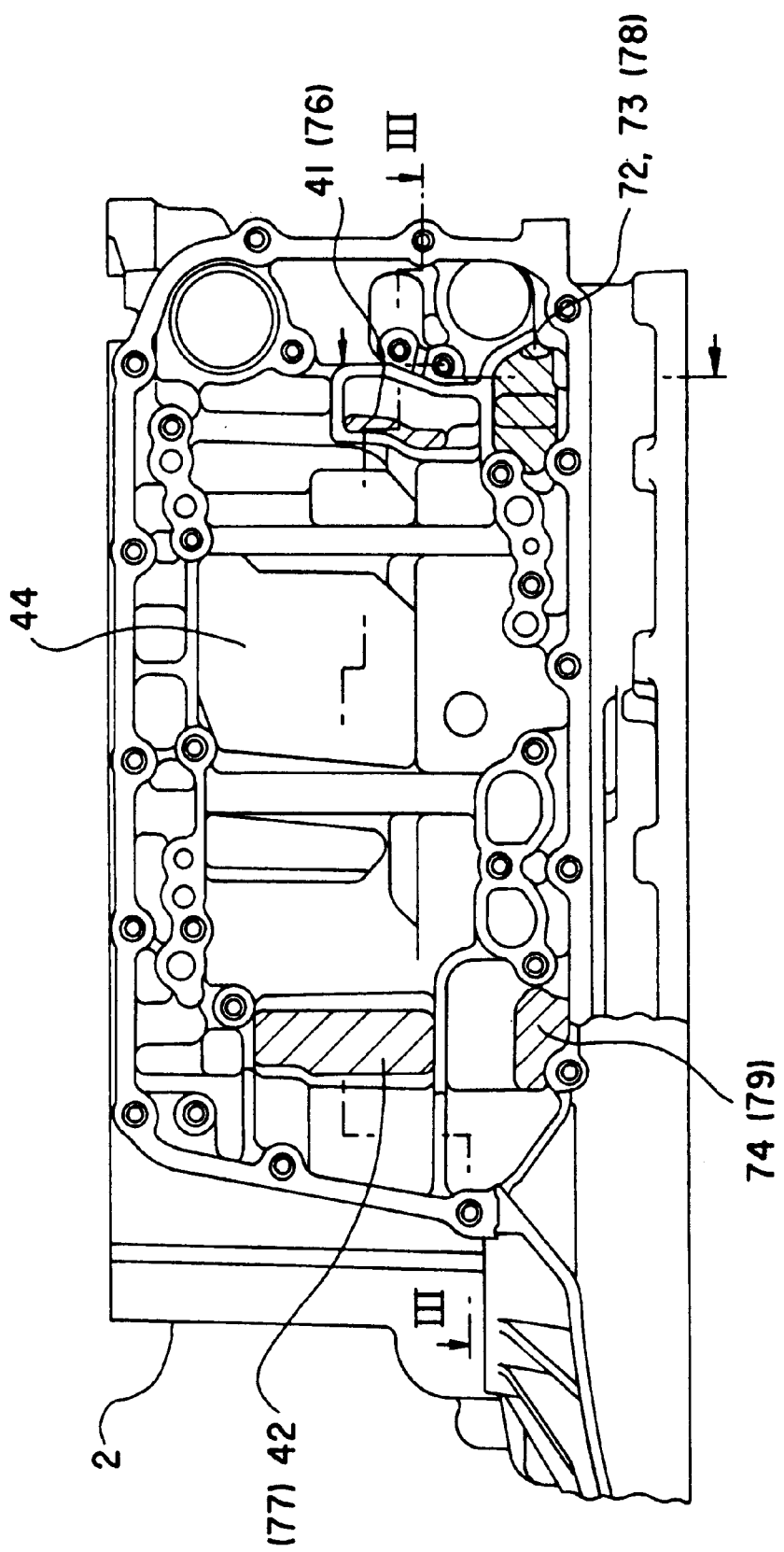
FIG. 2 is a sectional view of the housing of the vehicular transmission, seen upward from the bottom.

Now, in reference to FIGS. 2 and 3, the arrangement of the discharge oil passages is described in detail. FIG. 2 is a view seen in the direction indicated by arrows II—II in FIG. 1, i.e., a view of the housing seen from the bottom. To clarify the arrangement of the oil discharge passages, the inlet openings of the oil discharge passages are darkened in the drawing and are indicated by numerals, and the oil discharge passages are indicated by parenthetical numerals.

FIG. 3 is a sectional view of the housing seen in the direction indicated by arrows III—III in FIG. 2, and it shows the cross section taken by the plane which is perpendicular to the shafts of the pulleys and which passes through the respective middle points between the stationary pulley halves and the movable pulley halves of the pulleys, to illustrate the oil discharge passage 76, which is located toward the front of the vehicle, the oil discharge passage 77, which is located toward the rear of the vehicle, and the inlet openings 41 and 42 for these oil discharge passages. These two drawings show that the oil discharge passages and their inlet openings are provided in the pulley chamber R1, on one side of and near and above the oil pan, toward the front and rear of the vehicle, respectively.

By the way, the direction of the motion of the lubrication oil which departs from the belt at the above mentioned inflection point, i.e., the point of the directional change of the belt movement from the straight portion to the arc portion, where the belt starts encircling the respective pulley, does not exactly match an imaginary line which is drawn extending from the straight portion of the belt. However, the oil departs from the belt in a direction which is somewhat radially inward with respect to the direction of this imaginary extension line. The degree of this discrepancy depends on the viscosity of the lubrication oil, the rotational speed of the belt, and the pitch radii of the pulleys. In consideration of these factors, the position of the upper end of the inlet opening 41 of the oil discharge passage which is provided in the direction of the straight portion of the belt is determined appropriately to meet the condition of the belt which is at the TOP speed change ratio (i.e., the condition where the pitch radius of the drive pulley is at a maximum and that of the driven pulley is at a minimum). Also, the position of the lower end of the inlet opening is determined to meet the condition where the pitch radii of the respective pulleys are in the condition opposite to the above description. If the inlet opening determined in this way is too long to threaten the strength of the housing, then a rib can be provided appropriately in the middle of the opening.

In this transmission with the above mentioned arrangement, the hydraulic oil supplied to the drive pulley as well as the lubrication oil supplied to the pulley moves to the periphery of the pulley because of the centrifugal force, which is generated by the rotation of the pulley, and also some portion of the lubrication oil which is supplied to the belt moves to the periphery of the drive pulley because of the contact therebetween. Then, all the oil sticking to the drive pulley is thrown radially outward by the centrifugal force. It is confirmed experimentally that most of the oil thrown from the drive pulley is sprayed in the direction of the line which is drawn on the upper side of the pulleys tangent to the peripheries of the pulleys. Therefore, with the above mentioned arrangement of the inlet opening, the oil used in the pulley chamber for actuation and lubrication is efficiently returned to the oil pan.

The width of the inlet opening 41 in the direction of the pulley shafts is determined equal to the maximum width of the V shaped groove measured at the outer periphery of the drive pulley 8, which maximum width is attainable by moving the movable pulley half 8b as far as possible from the stationary pulley half 8a. Because the width of the V-shaped groove of the pulley is greater or equal to the width of the belt, the width of the lubrication oil departing from the belt 10 is smaller than or equal to the width of the inlet opening 41. Because the inlet opening 41 is formed with the width and the length which are determined as described above, most of the lubrication oil departing from the belt is received through the inlet opening into the oil discharge passage. In consideration of the compactness and discharge performance of this inlet opening, it is preferable that the width of the inlet opening be about 3⁄2 of the maximum width of the V-shaped groove.

The lubrication oil which is thrown radially from the V-shaped grooves of the drive and driven pulleys 8 and 9 by the respective centrifugal forces hits the inner wall of the pulley chamber R1 and then flows down along the inner wall by the gravitation. The part of the lubrication oil which hits the portion of the inner wall just above and the portion located on the right side of the drive pulley 8 in FIG. 1 flows down along the inner wall toward the lower right in the drawing and into the inlet opening 41 of the oil discharge passage which leads to the oil pan 26. Also, the lubrication oil which hits the portion of the inner wall of the pulley chamber R1 just above and the portion located on the left side of the driven pulley 9 flows down along the rounded portion of the inner wall located on the left side of the respective pulley. To discharge this lubrication oil, the inlet opening 42 is positioned at a midpoint between both the pulleys.

At the downstream side in the flow of the lubrication oil in the inlet opening 42, which leads to an oil discharge passage, a wall 43 is provided protruding into the pulley chamber R1 in the direction of the pulley shafts, to discharge reliably through the inlet opening 42 a large amount of lubrication oil which flows down along the wall. Therefore, it is preferable that the width of this inlet opening (i.e., the width of the inlet opening in the direction of the pulley shafts) be equal to or more than the maximum width of the V-shaped groove at the outer periphery of the driven pulley 9. In this embodiment, the inlet opening is widened to the side of the movable pulley half 9b.

The stationary pulley half 8a of the drive pulley 8 includes rectangular raised portions 52, which are provided for the measurement of the rotational speed of the drive pulley 8, and a cover 51 is provided under the drive pulley 8 in the pulley chamber R1 to cover these rectangular raised portions 52 partly. This cover 51 is, for example, press molded from a sheet metal of steel, aluminum, etc. into a shape which conforms with the drive pulley 8 and the pulley chamber R1, and it is then bolted in the housing.

Figure 5:
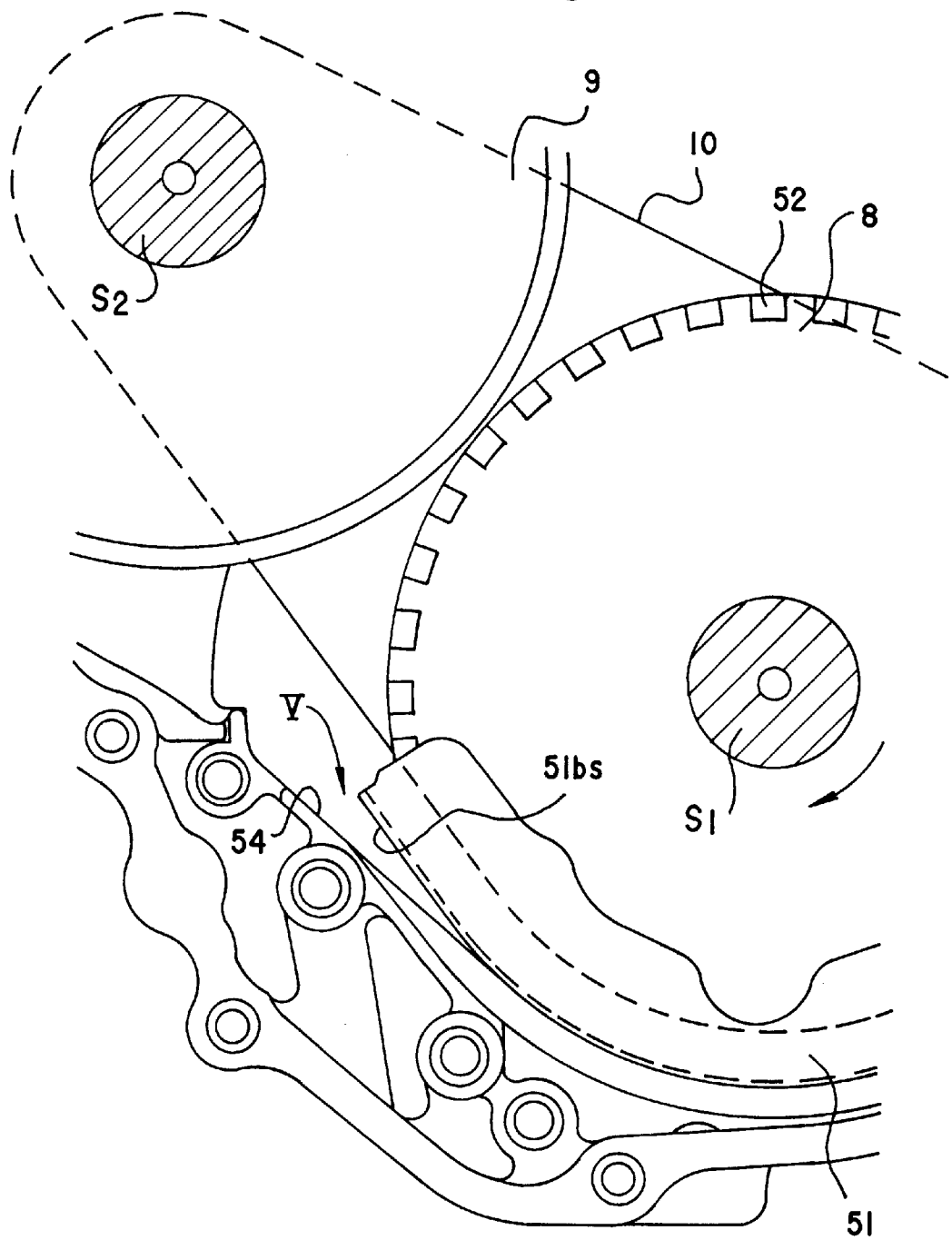
FIG. 5 shows the relative position of the cover, which is mounted in the pulley chamber, to an inner wall of the pulley chamber.

In this embodiment, the cover 51 is formed to cover the outer periphery of the stationary pulley half 8a, with one end 51a of the cover 51 reaching the inlet opening 41 for the discharge oil passage and the other end 51b being detached from the inner wall of the pulley chamber R1. FIG. 5 shows an enlarged view of the vicinity of the end 51b whose surface 51bs facing the inner wall 54 of the pulley chamber R1 is positioned away from the inner wall 54 with a clearance V therebetween. To discharge the lubrication oil from the inside of the cover to the oil pan 26, an inlet opening 51c is provided for the discharge oil passage, at the bottom portion of the cover 51, the bottom portion being the lowest portion of the cover 51 in the mounted condition. FIG. 6 shows the relative positions of the cover 51, the raised portions 52 of the drive pulley 8, and a rotational frequency detector 53, which detects the rotational speed of the drive pulley 8. The clearance V between the end surface 51bs and the inner wall 54 of the pulley chamber R1 is determined such that the end 51b of the cover does not interfere with the belt 10, which is disposed around the pulleys.

In this continuously variable transmission, the lubrication oil flowing down along the inner walls of the pulley chamber increases in amount, the oil dripping down directly from the part of the inner wall which faces downward increases in amount, the oil which is thrown from the drive pulley 8, the driven pulley 9 and the belt 10 and hitting the part of the inner walls that is located below the inlet openings 41 and 42 of the discharge oil passages 76 and 77 increase in amount, and the oil accumulates at the lower portion of the pulley chamber. Even in such condition, this accumulated oil at the bottom of the pulley chamber cannot be agitated by the drive pulley because of the existence of the cover 51, which constitutes an inner wall and prevents the lubrication oil from flowing into the cover.

On the other hand, while the lubrication oil is being scattered by the centrifugal force which is generated by the rotation of the pulleys, some part of the oil hitting the cover 51 is caught in the cover, and this oil flows down along the cover. However, the amount of the oil flowing in the cover is relatively small because of the design of the cover, which functions as described above. Furthermore, as the rotational direction of the pulleys stays in one direction (shown by an arrow in the drawing) except when the vehicle moves backward (i.e., when the rotation of the input shaft is reversed by the forward-reverse selector mechanism 3), the direction of the flow of the lubrication oil in the cover 51 also stays in the same direction, and this condition keeps the friction (rotational resistance) of the oil relatively small.

The end surface 51bs of the cover 51 is positioned away from the inner wall 54 of the pulley chamber R1 with a clearance V therebetween as shown in FIGS. 1 and 5. In this construction, the lubrication oil flowing down along this part of the wall is not likely to flow into the cover 51. If the oil flew freely in this direction, which is the opposite direction to the rotational direction of the pulleys, and if the oil flowing down touched the drive pulley 8, then it would cause a substantial resistance or loss in the rotation of the drive pulley 8. However, this construction of the cover 51, which is mounted away from the wall in this direction, restricts the flow of the oil into the cover 51 in a minuscule amount, so the rotational resistance or loss caused from the oil is very small.

In this way, the lubrication oil which is used for the lubrication of the drive pulley 8, the driven pulley 9, the belt 10, etc. in the pulley chamber R1 as well as the hydraulic oil which is used for adjusting the widths of the pulleys is discharged through the inlet opening 41 of the discharge oil passage 76, which is located to the front of the vehicle, through the inlet opening 42 of the discharge oil passage 77, which is located to the rear of the vehicle, and through the inlet opening 44 of the discharge oil passage, which is provided at the bottom of the pulley chamber R1, all the discharge oil pass leading the lubrication oil to the two sides of the oil pan 26 (i.e., close to the side toward the front of the vehicle and to the side toward the rear of the vehicle) in the horizontal direction which is perpendicular to the input and output shafts.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No.10-253358 filed on Sep. 8, 1998, which is incorporated herein by reference.

What is claimed is:

1. A vehicular transmission comprising:

a housing;

a transmission device including a drive pulley, a driven pulley and a belt which is disposed around drive and driven pulleys for torque transmission and a chamber contained within said housing for accommodating said transmission device, wherein said drive or driven pulley includes a raised portion on its periphery for detection of rotational speeds of said pulleys, and wherein said vehicular transmission further comprises a partial cover which covers only a lower peripheral portion along the periphery of said drive or driven pulley that is positioned at a lower part of said chamber for preventing oil accumulated at a bottom of the chamber from being agitated, said peripheral portion including said raised portion.

2. The vehicular transmission as set forth in claim 1, wherein an end surface of said cover is positioned away from an inner wall of said chamber with a clearance provided therebetween.

3. The vehicular transmission as set forth in claim 1, wherein said pulley that is positioned at the lower part of said chamber comprises a stationary pulley half, which is axially fixed on a rotating spindle, and a movable pulley half, which faces said stationary pulley half and movable axially over said rotating spindle, and wherein said stationary pulley half and said movable pulley half together form a V groove therebetween, in which said belt is disposed, and wherein said raised portion is provided on the periphery of said stationary pulley half.

* * * * *